United States Patent
Myers et al.

(10) Patent No.: US 6,651,493 B2
(45) Date of Patent: Nov. 25, 2003

(54) TORQUE CONVERTER DYNAMOMETER AND METHOD OF USING SAME

(75) Inventors: John E. Myers, Reno, NV (US); Randy A. Nation, Norwalk, IA (US); Lawrence G. Kruse, Ankeny, IA (US)

(73) Assignee: Hicklin Engineering, L.C., Des Moines, IA (US)

( * ) Notice: Subject to any disclaimer, the term of this patent is extended or adjusted under 35 U.S.C. 154(b) by 0 days.

(21) Appl. No.: 09/848,636

(22) Filed: May 3, 2001

(65) Prior Publication Data

US 2002/0005074 A1 Jan. 17, 2002

Related U.S. Application Data (60) Provisional application No. 60/202,088, filed on May 4, 2000.

(51) Int. Cl.⁷ .......................... G01M 19/00; G01L 3/00
(52) U.S. Cl. ................. 73/119 R; 73/118.1; 73/862.08
(58) Field of Search .................... 73/862.08, 119 R, 73/118.1

(56) References Cited

U.S. PATENT DOCUMENTS

| | | | |
|---|---|---|---|
| 3,016,740 A | | 1/1962 | Raidl |
| 3,060,730 A | | 10/1962 | Lucia |
| 4,356,724 A | * | 11/1982 | Ayoub et al. ............. 73/118.1 |
| 4,520,659 A | | 6/1985 | Lucia et al. |
| 4,592,228 A | | 6/1986 | Lucia |
| 5,515,272 A | * | 5/1996 | Sakai et al. ............... 180/273 |
| 5,537,865 A | * | 7/1996 | Shultz ...................... 73/118.1 |
| 5,773,727 A | * | 6/1998 | Kishiro et al. ........... 73/861.355 |
| 6,044,697 A | * | 4/2000 | Imano ....................... 73/118.1 |

FOREIGN PATENT DOCUMENTS

| JP | 04105039 A | * | 4/1992 | ......... G01M/13/02 |
|---|---|---|---|---|
| JP | 05026777 A | * | 2/1993 | ......... G01M/13/02 |

OTHER PUBLICATIONS

Publication 97000 ECRH, "The New Generation" Automatic Transmission Tester, Hicklin Engineering, Des Moines, Iowa, publ. at least as early as Jan. 1999.

* cited by examiner

Primary Examiner—Edward Lefkowitz
Assistant Examiner—Lilybett Martir
(74) Attorney, Agent, or Firm—McKee, Voorhees & Sease, P.L.C.

(57) ABSTRACT

A dynamometer provides an apparatus and method for testing a torque converter without requiring that an automotive transmission be attached. The dynamometer includes a prime mover mounted on a frame for driving the torque converter. A dynamic loading device with an eddy current brake is movably mounted on the frame. An adapter extends between the loading device and the torque converter and has passages for routing hydraulic fluid to and from the torque converter. Sensors connected to a computer monitor pressures, temperatures and fluid flow.

20 Claims, 6 Drawing Sheets

TORQUE CONVERTER DYNAMOMETER AND METHOD OF USING SAME

CROSS-REFERENCE TO RELATED APPLICATIONS

This application claims is based upon and claims priority of U.S. Provisional Application Ser. No. 60/202,088 filed May 4, 2000.

BACKGROUND OF THE INVENTION

The present invention relates to the field of testing automotive driveline components. More particularly, this invention relates to a dynamometer and method for testing new, rebuilt, or repaired hydraulic torque converters used in automatic transmissions for automotive drivelines. The invention allows the torque converter to be independently flushed and tested as a component prior to its attachment to a transmission and final assembly with an engine to form the driveline.

Dynamometer systems of various types are well known and commercially available. However, a major drawback of conventional dynamometers is that they generally test the driveline as a whole or, in some cases, the transmission and torque converter together as a subassembly. This presents problems to those who manufacture, repair or rebuild torque converters, and even the final driveline assembler.

The manufacturing, repair and rebuild processes can leave contamination in the torque converter. The torque converter normally shares hydraulic fluid with the automative transmission. Therefore, contaminated torque converter can damage the transmission by contaminating it, possibly leading to failure of the transmission and driveline. When performance testing of the torque converter is not done until after its assembly into the driveline testing, removal and replacement or repair of a poorly performing torque converter can be troublesome, time-consuming and expensive. It is also more difficult at that point to isolate or determine the root cause of any performance problems observed. The performance problem may be coming from the transmission, the engine, or the torque converter.

It would be more efficient if the torque converter could be tested as a separate isolated component. Such separate testing capability for torque converters would greatly benefit automotive driveline manufacturers, original equipment manufacturers of torque converters, torque converter rebuilders, automotive service centers, and aftermarket manufacturers.

Thus, a primary objective of the present invention is the provision of a dynamometer for testing hydraulic torque converters.

Another objective of this invention is the provision of a dynamometer for testing hydraulic torque converters without attaching them to an automatic transmission.

Another objective of this invention is the provision of an adapter assembly whose front portion is adapted to support and sealingly engage a torque converter and whose rear portion is adapted to connect to a loading device.

Another objective of this invention is the provision of a dynamometer that can be adapted to test torque converters alone or as part of transmission assemblies.

Another objective of this invention is the provision of a torque converter dynamometer that can be easily adapted for use with existing test stands and data acquisition apparatus.

These and other objectives will be apparent from the drawings, as well as from the description and claims that follow.

SUMMARY OF THE INVENTION

This dynamometer adaptation to effect a torque converter dynamometer will be capable of mounting on commercially available dynamometer systems, such as the EDECT Transadyne Test Stand or more preferably, dynamometer systems manufactured by Axiline Precision Products of Green Bay, Wis., U.S.A. Alternatively, the torque converter dynamometer can be constructed as a single, stand-alone or self-contained unit. The application will require an input drive motor or prime mover and utilize the existing commercially available pilot adapters, spools, spacers, and flexplates.

Each torque converter dynamometer requires an adapter assembly including an outer housing with seal and bushing to match the hub diameter of the converter, a stator (support) shaft to match the stator splines of the converter, and a turbine shaft to connect the torque converter turbine and a loading device. Some commonality of parts exists and will be utilized where applicable. These components can preferably be detachably installed onto a torque converter test stand or support frame within a short period of time to ensure minimal changeover time. The outer housing of the adapter assembly receives the hub of the torque converter and supports the converter around the stator shaft while it is moved from the load position into the test position and connected at the prime mover, which supplies the input drive. Concentric alignment should be built into the adapter assembly and the test stand as a whole. Once into position, the torque converter support frame or adapter will be latched into place with an interlock, prohibiting operation if not latched. Additionally the input drive should be interlocked to avoid rotation of the torque converter without first activating a pump that supplies fluid to the torque converter through fluid passages in the adapter assembly. The loading device provides the output load and can provide measurements of the dynamic torque.

In one manually-operated embodiment, the standard machine provides the measurements using analog and/or digital gauges and displays. The operator will be responsible for manually recording the required test points on a standardized form.

Computerized test control data acquisition can also be provided as an option utilizing standard data acquisition procedures and equipment. Sensors are connected to a computer and are used to generate various measurements, including input torque, output torque, stall point, input speed, output speed, speed ratio, coupling point, K factor, and outlet temperature at specified test points. Vibration will be monitored for abnormality. Through an attached printer, the computer can generate a printed report showing the measured or calculated values with an acceptance or rejection statement based upon pre-determined criteria to be established by the equipment user.

BRIEF DESCRIPTION OF THE DRAWINGS

FIG. 1B is a front elevation view similar to FIG. 1A but shows an alternative loading position wherein the torque converter is disconnected from the prime mover and supported by the adapter assembly.

DETAILED DESCRIPTION OF THE PREFERRED EMBODIMENT

The present invention will be described as it applies to a preferred embodiment. It is not intended that the present invention be limited to the described preferred embodiment. It is intended that the invention cover all modifications and alternatives which may be included within the spirit and broad scope of the invention.

Figure 1:
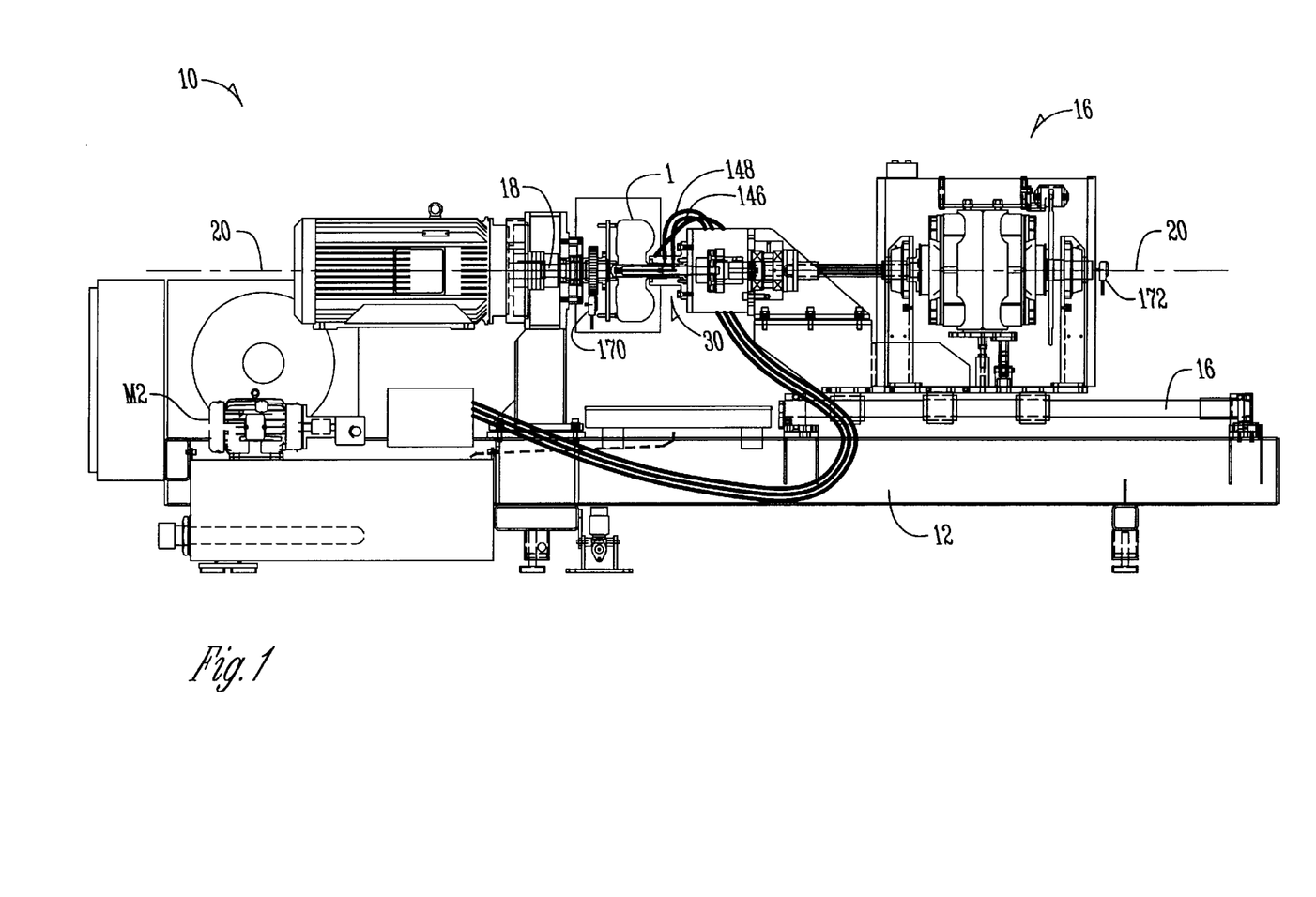
FIG. 1 is a front elevation view of the dynamometer of this invention.

Although this invention is applicable to existing dynamometers, it is described below as a stand-alone apparatus and method for testing hydraulic torque converters. FIG. 1 shows a dynamometer or torque converter testing apparatus 10 that includes a frame 12 with a prime mover 14 and a dynamic loading device 16 mounted thereon. The prime mover 14 is preferably a variable speed electric motor. However, other types of prime movers can be utilized. In fact, the prime mover 14 can be changed to provide different conditions for the torque converter. For instance, a high power prime mover can be used to test the performance of the torque converter under high loads. Prime movers having various horsepower capabilities can also be used if desired. The prime mover 14 has a rotatable output shaft 18 that has a central longitudinal axis of rotation 20. The output shaft 18 drivingly engages or connects with the torque converter to be tested through conventional coupling means and a conventional flexplate.

Figure 3:
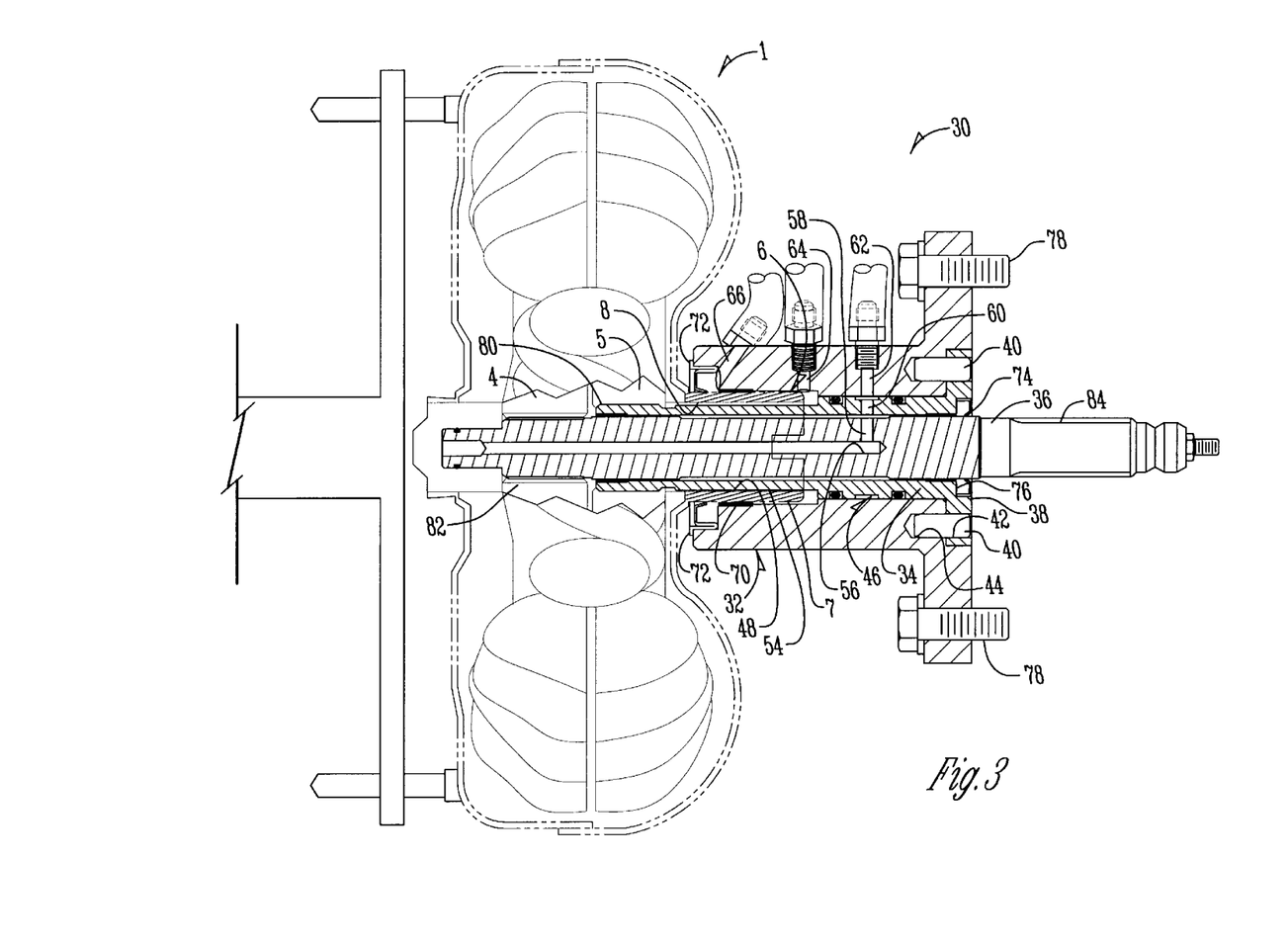
FIG. 3 is a partial vertical sectional view taken along the rotational axis of the dynamometer of FIG. 1 and shows an adapter assembly according to this invention.

A typical conventional torque converter 1 includes an outer casing 2, an impeller 3, a turbine 4, and a stator 5, as best seen in FIG. 3. The rear end of the casing 2 has a hub 6 thereon with an outer diameter 7 and an inner diameter 8.

Figure 1A:
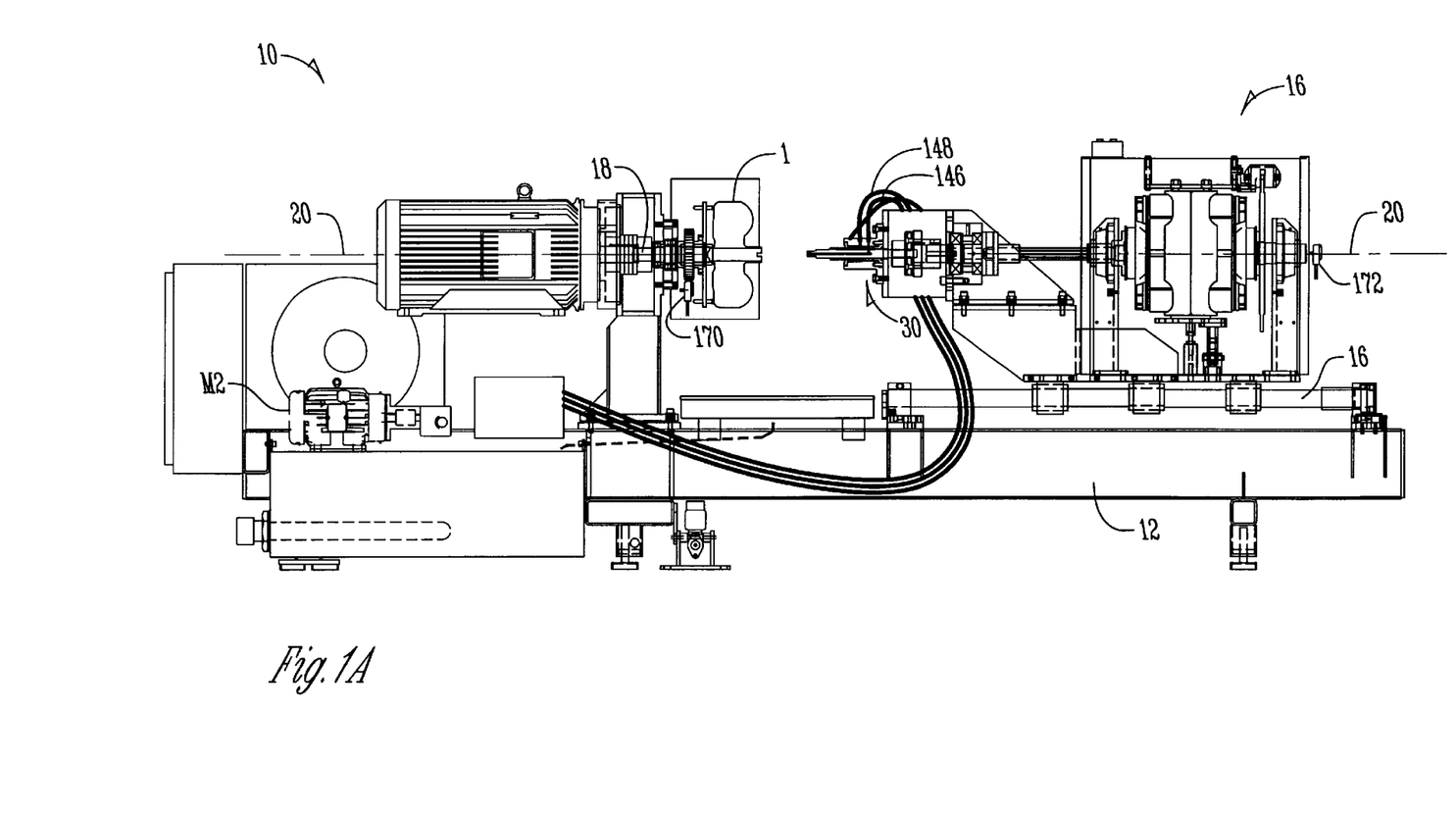
FIG. 1A is a front elevation view similar to FIG. 1 but shows the loading device retracted away from the prime mover and into the load position, which facilitates changing the adapter assembly or inserting and removing the torque converter.

The dynamic loading device 16 is an Eddy current generator that converts rotational mechanical energy into heat. The loading device 16 includes an Eddy current brake that provides controllable, constant, and repeatable dynamic load. An aircraft-grade disc/caliper stall brake assembly 17 is also provided in conjunction with the Eddy brake so as to allow full load stall testing. A load cell 19 is also provided on the loading device 16. The dynamic loading device 16 includes a rotational input connection 22, preferably a splined socket 24, that is coaxial with the output shaft 18 of the prime mover 14. Preferably, at least one of the prime mover 14 and the loading device 16 is movable with respect to the other along the central longitudinal axis of the output shaft 18. The relative movement can be accomplished in a number of conventional ways, including but not limited to slidably mounting the loading device 16 on the frame by means of one or more rail members and a powered screw mechanism 28 for moving the loading device 16 along the rail member(s) 26, as best seen in FIGS. 1 and 1A. Alternatively, the prime mover 14 could be movable and the loading device 16 could be stationary.

Referring to FIGS. 1 and 3, an adapter assembly 30 is interposed between the prime mover 14 and the loading device 16. The adapter assembly 30 detachably mounts to and drivingly engages the loading device 16. The adapter assembly 30 includes a housing 32 with a bore 33 therethrough that rotatably supports a stator shaft 34 and a turbine shaft 36. The stator shaft 34 is elongated with an enlarged diameter flange 38 at the rearward end adjacent the loading device 16. A plurality of dowel pins 40 extend through radially spaced holes 42 in the flange 38. The dowel pins 40 are press fitted into holes 44 in the rear end of the adapter housing 32 to secure the stator shaft 34 against rotation with respect to the housing 32. An annular groove 46 is formed on the stator shaft 34 forwardly adjacent to the flange 38. The stator shaft 34 also includes a central longitudinal bore 48 for receiving and rotatably journaling the turbine shaft 36 with the assistance of bearings or bushing 50, 52. Between the bushings 50, 52, the turbine shaft 36 has a reduced diameter portion 54. A central longitudinal passage 56 extends from the forward end of the turbine shaft 36 and into the reduced diameter portion 54. A cross passage 58 intersects the passage 56 and generally aligns with a passage 60 in the stator shaft 34 so as to connect the annular groove 46 with the passages 56, 58. Sealing means 62 are provided on the stator shaft 34 adjacent both edges of the annular groove 46. Alternatively, the sealing means could be provided on the wall of the housing bore 33.

Three fluid passageways 62, 64, 66 are provided in the housing 32. The first fluid passage 62 is generally aligned with and in fluid communication with the annular groove 46. The second fluid passage 64 is in fluid communication with the torque converter casing 2 through a gap that exists between the inner diameter 8 of the torque converter hub 6 and the outer diameter of the stator shaft 34. The outer diameter 7 of the hub 6 is rotatably journaled in the adapter housing by the bushing 70. A lip seal 72 allows the converter hub to be sealingly engaged with the front portion of the adapter assembly 30. The third fluid passage 66 is in fluid communication with the area just behind the lip seal 72 so as to prevent seal leakage or blowout due to excessive pressure buildup behind the seal. A second lip seal 74 is placed in a recess 76 of the flange portion 38 of the stator shaft 34. The lip seal 74 prevents oil from leaking out the rear portion of the adapter assembly 30. The rear portion of the adapter assembly 30 has a mounting flange thereon that is secured to the loading device 16 by conventional fastening means, such as a plurality of screws 78.

The forward end of the stator shaft 34 has engagement means 80 thereon, such as splines, for matingly engaging similar structures on the torque converter stator 5. Likewise, the forward end of the turbine shaft 36 has engagement means 82 thereon, such as splines, for matingly engaging similar structures on the torque converter turbine 4. The rear end of the turbine shaft 36 has engagement means 84, such as splines, to matingly engage similar means on the socket 24 of the loading device 16. A reduced diameter portion 86 can be included on the rearward end of the turbine shaft 36 to receive a locking detent mechanism (not shown) and an adjustable length screw means can be provided at the end to allow the depth of engagement with the loading device 16 to be adjusted. This also keeps the turbine shaft 36 properly located with respect to the stator shaft 34 and the rest of the components. The connection of the adapter assembly 30 to the loading device 16 is best seen in FIG. 1. The connection of the adapter assembly 30 to the torque converter 1 is best seen in FIG. 3.

Figure 3A:
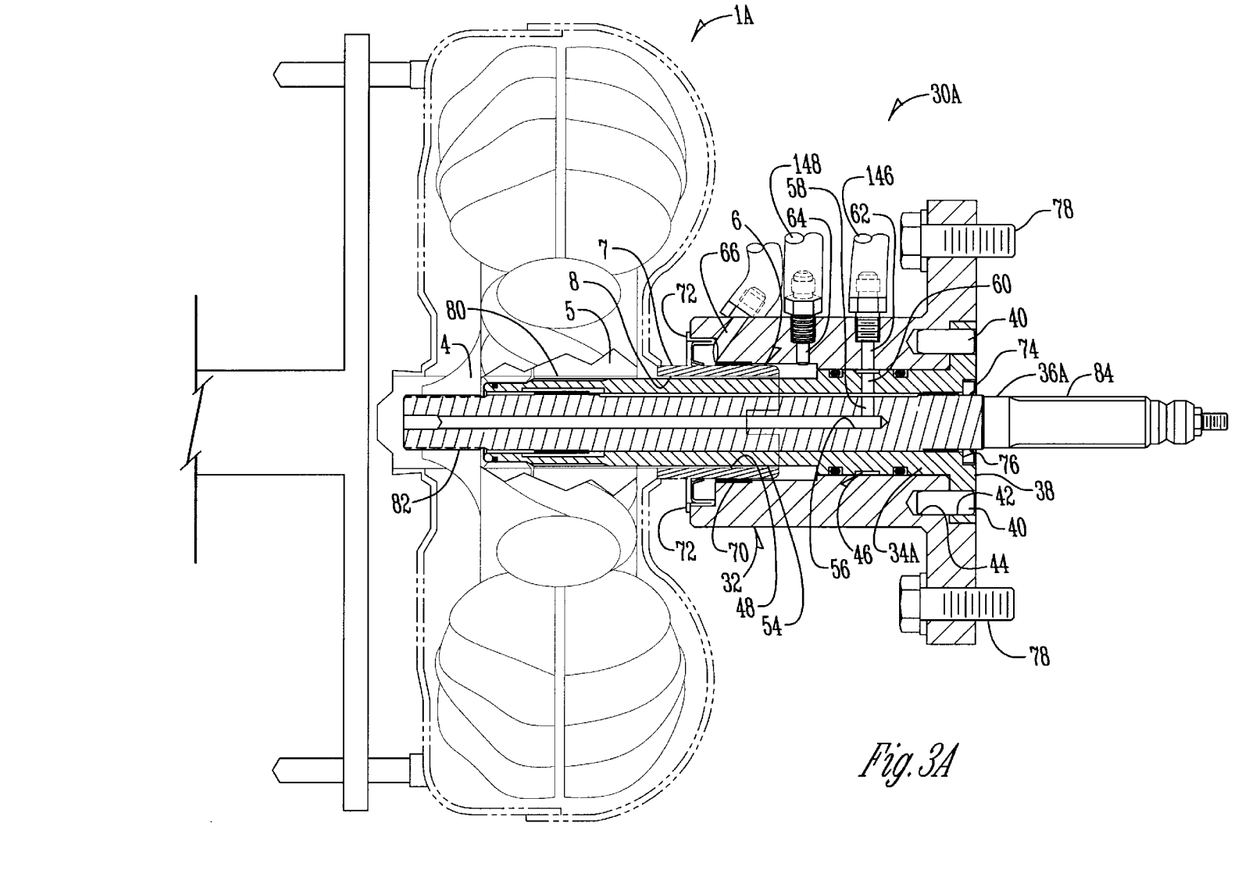
FIG. 3A is similar to FIG. 3 but illustrates the versatility of this invention by showing another adapter assembly equipped with differently configured stator and turbine shafts.

FIG. 3A illustrates the versatility of the adapter assembly of the present invention. To test a different torque converter 1A, a new adapter assembly 30A has been constructed merely by changing to differently configured stator and turbine shafts 34A and 36A respectively. The housing 32 remains the same. In some cases only the stator shaft 34A will need to be changed, and in other cases only the turbine shaft 36A will need to be changed.

Figure 4:
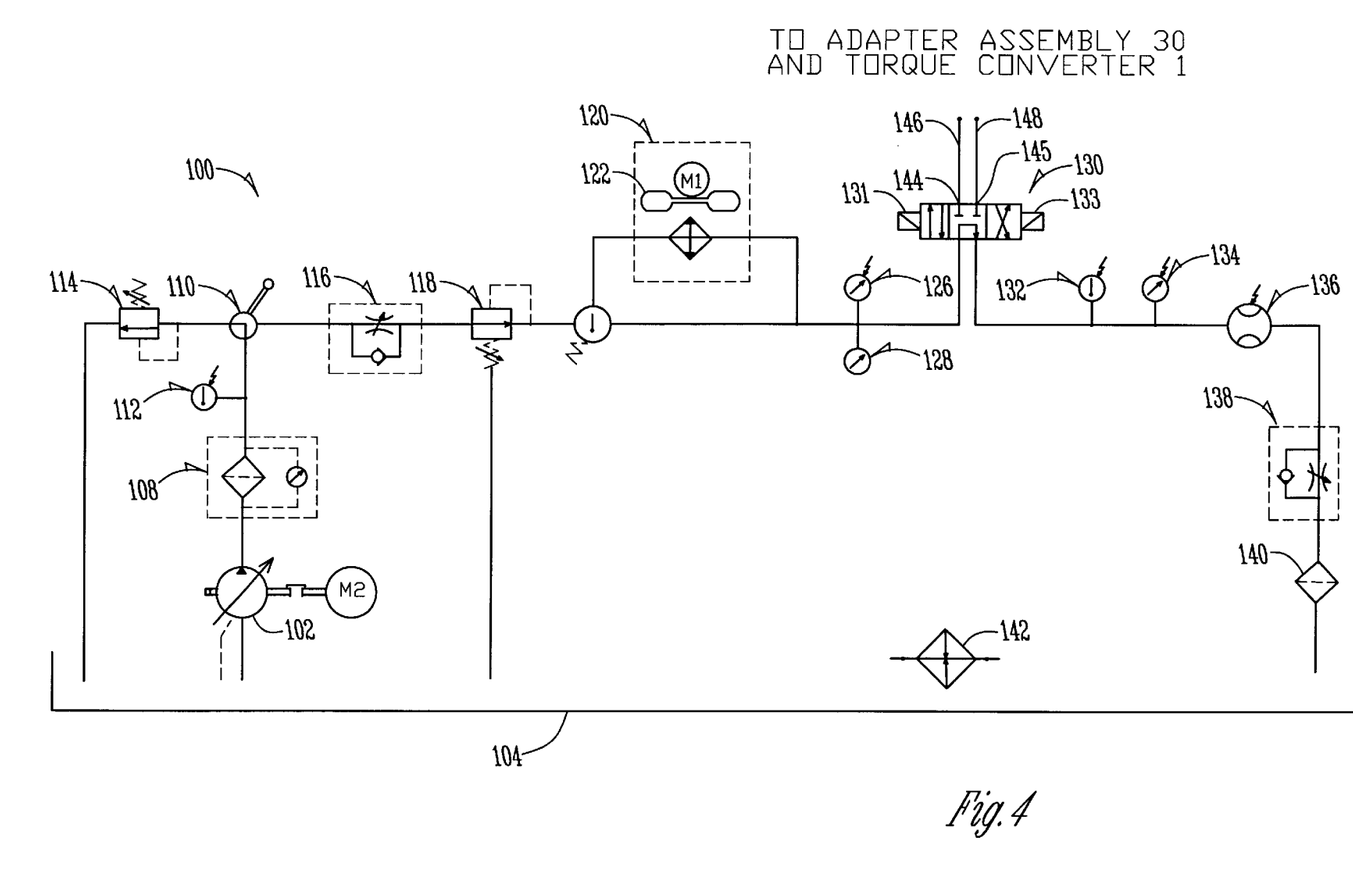
FIG. 4 is a hydraulic schematic of the dynamometer of FIG. 1 and shows how hydraulic fluid is selectively supplied to the torque converter through the lockup valve and the adapter assembly.

The hydraulic components of the dynamometer 10 can best be understood in view of the schematic diagram of FIG. 4. The torque converter 1 is supplied with fluid by an open circuit hydraulic system 100. The system 100 includes a variable displacement pressure compensated open circuit pump 102 that is driven by an electric motor M2 in order to draw fluid from a reservoir 104. The pump output line 106 connects to a pressure filter 108 and thereafter to a 3-way ball valve 110. A temperature sensor 112 is included between the pressure filter 108 and the ball valve 110 to provide data about the temperature of the fluid entering the torque converter 1. The ball valve 110 is fluidly connected to an adjustable heater relief valve 114. The ball valve 110 is also fluidly connected to an inlet flow control valve 116 that includes a variable orifice in parallel with a check valve.

An adjustable pressure regulator valve 118 is included downstream of the inlet flow control valve 116. An oil cooler 120 is provided downstream of the pressure regulator 118. The oil cooler 120 has a fan 122 driven by a motor M1 to cool the fluid passing through the oil cooler. A thermostatic valve 124 is positioned in the circuit so that the oil is diverted to the oil cooler 120 if the temperature sensor 112 indicates that the desired inlet temperature has been exceeded, and bypasses the oil cooler if the temperature is not at the desired value. A pressure inlet sensor 126 and a pressure inlet gage 128 are provided downstream of the thermostatic valve 124.

A lock up control valve 130 having parts 144, 145 with hoses 146, 148 attached thereto controls the supply of fluid to the adapter assembly 30 and torque converter 1, as well as the direction of the fluid flow. The control valve 130 is preferably a three-position four-way valve operated by solenoids at either end. The return line 149 to the reservoir 104 includes an outlet temperature sensor 132, an outlet pressure sensor 134, and a flow sensor 136. The return line 149 further includes an outlet flow control valve 138 similar to the inlet flow control valve 116. Fluid is then routed through a return filter 140 and dumps back into the reservoir 104. A heater 142 is provided in the reservoir to maintain the desired inlet temperature.

Figure 2:
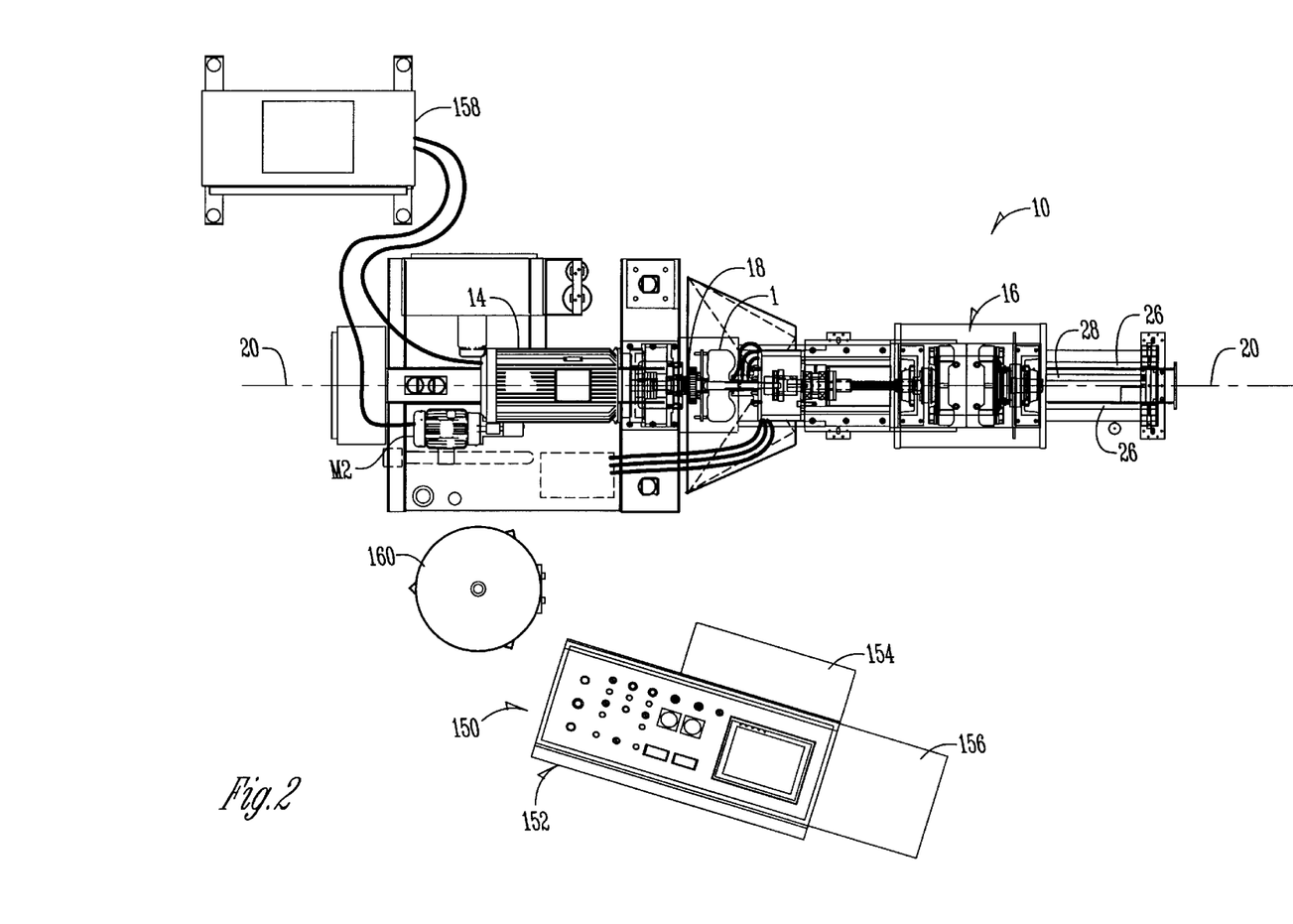
FIG. 2 is a top plan or layout view of a test area equipped with the dynamometer of FIG. 1.

A speed sensor 170 is operatively associated with the output shaft 18 of the prime mover 14 to provide data concerning the input speed at the torque converter 1. Likewise, speed sensor 172 is associated with the loading device 16 so that the output speed of the torque converter 1 can be determined. Thus, data acquisition means 150 are provided on a dynamometer 10. The data acquisition means 150 include a plurality of sensors as previously described. As best seen in FIG. 2, the data acquisition means 150 optionally includes a computer 152 having a keyboard 154 and a printer 156 associated therewith. The computer coordinates the collection of data from the various sensors and can even be programmed to execute specific test sequences. Electrical power for the dynamometer and the computer can be provided by a conventional electrical panel 158 or other source of electrical energy located nearby.

An optional purge station 160 can be provided to allow the torque converter 1 to be turned upside down and drained of fluid after the test is completed.

Thus, the dynamometer 10 of this invention provides a method of testing a new or rebuilt torque converter 1 independently of a transmission. The method includes the steps of moving the loading device 16 to the retracted position of FIG. 1A. Alternatively, the converter 1 moves with the loading device 16. The operator builds the adapter assembly 30 in the configuration necessary to mate with the torque converter 1 to be tested and the loading device 16. In other words, the operator selects the appropriate stator shaft 34, turbine shaft 36, and housing 32. The operator mounts the rear portion of the completed adapter assembly 30 to the loading device 16.

The operator then mounts the torque converter 1 to the prime mover 14. The operator attaches the hydraulic lines 146, 148 to the adapter assembly 30, if this has not already been done. The operator slides the adapter assembly 30 and loading device 16 forward as a unit to couple them with the torque converter 1.

The operator must activate the open circuit pump 102 and set the flows, pressures and temperatures according to well known published specifications provided by the automobile manufacturers. The user can verify that the torque converter 1 has been filled with oil by observing the flow meter sensor 136 in the return line. Once the desired initial conditions are established, the operator can initiate a manual or an automated preprogrammed test sequence. The test sequence includes but is not limited to the following steps: 1) purge, 2) stall, 3) ramp to speed, 4) lockup, 5) check lockup clutch holding capacity, and 6) shut down.

The sensors and the computer (if provided) are utilized to monitor the following variables at each of the steps above: $P_1$ (inlet pressure), $P_2$ (outlet pressure), $T_1$ (inlet temperature) $T_2$ (outlet temperature), Q (flow), $N_1$ (input speed), $N_2$ (output speed), $T_1$ (input torque), and $T_2$ (output torque). The performance of the torque converter 1 can be determined from these values according to known formulas. Performance charts and graphs can also be generated from this data.

The purge step involves slowly spinning the output shaft 18 of the prime mover with the stall brake of the loading device 16 applied. During the stall step, the stall brake is completely locked so that the turbine shaft is locked or prevented from turning, just like the loading device 16. Then full input power or rotational energy is provided by the prime mover 14 so that the K factor of the torque converter can be determined. The ramping step is accomplished by releasing the stall brake and letting the output speed at the loading device come up to full speed. The flow of hydraulic fluid through the adapter assembly 30 is as follows in this step. The solenoid 131 is activated, thereby urging the lockup control valve 130 into the position shown on the left in FIG. 4. In this position, the fluid flows from the pump 102 through the valve 130, port 144 and hose 146 to the adapter assembly 30. Thus, fluid flows into the fluid passage 62 of the adapter housing 32. The fluid flows through the passage 60 in the stator shaft 34 and through passages 56, 58 in the turbine shaft to reach the torque converter 1. The fluid flows out of the torque converter 1 through the gap between the hub inner diameter 8 and the stator shaft 34, then out the passage 64 and through the hose 148 and part 145 so as to return to the reservoir 104.

In the lockup step, the solenoid 133 is activated to move the valve 130 into the position on the right in FIG. 5 and the flow through the adapter assembly 30 and the torque converter 1 is reversed. The speed sensors 170, 172 are monitored to verify that the input speed to output speed ratio is 1:1. This step is particularly difficult to do on conventional dynamometers because the torque converter is attached to a transmission rather than directly to the loading device 16. The step of checking for lockup clutch holding capability involves applying a high dynamic load with the loading device 16 to verify that the lockup clutch of the torque converter will hold. The shut down step involves stopping the flow of the pump 102 or diverting its discharge with the ball valve 110. Then the loading device 16 with the adapter assembly 30 and torque converter 1 mounted thereon is retracted rearwardly along the rails and into the unloading position. The torque converter 1 can then be removed from the dynamometer 10 and turned upside down on the purge station 160 to drain any residual oil left therein.

Although some of the measurement requirements, system settings, and safety features may have been discussed above, they are repeated below in summary form for the preferred embodiment.

As for measurement requirements, the input torque is measured by using the motor drive analog output programmed for torque measurement. Optionally, torque meter may be supplied at the input as special equipment and design. Output Torque is measured dynamically and statically by the load cell 19 on the loading device 16. The temperature of fluid supplied to the converter is measured by the temperature sensor 112 or RTD in the fluid line, whereas the temperature of the fluid returning from the converter is measured by the temperature sensor 132 or RTD in the fluid line. Input speed is measured by utilizing the motor rpm signal from a speed sensor 170 at the motor drive (prime mover 14). The speed sensor 170 can be in the form of a pulse pickup unit that senses the passing teeth on a gear attached to the output shaft 18. Output speed of the converter 1 is determined by measuring the rpm on the loading device 16 from a speed sensor 172, which can include a pulse generator. The speed sensor 172 should be capable of measuring zero speed. Oil flow on the discharge side is measured by the flow sensor 136, which is of the flow meter type and suitable for 0 to 5 gpm. Mechanical noise may be observed by the operator. Inlet pressure is measured by the sensor 126, which may incorporate a safety shutdown to avoid over pressure of the torque converter. Outlet pressure from the torque converter is measured by the sensor 134. Vibration is measured by an accelerometer on the support frame 12.

The following system settings have been found to work well on certain torque converters. Pressure should be regulated between 80 to 120 psi. The pressure relief valve 114 should be set at approximately 135 psi. Flow is dependent upon the requirements of the torque converter. The system will generally be capable of flows between 0 and 5 gpm. This may be controlled by the variable displacement pump 102 or flow control valve 116. Inlet temperature should be controlled to simulate operating conditions of the torque converter. The fluid heater 142 is included for preheating the oil if necessary. Cooling capacity shall be one half to two thirds of the input horsepower because of the heat load created in the stall condition. This may require a temperature modulating circuit in order to control output temperature and have a cooler 120 that is capable of full horsepower heat load. The pressure filter 108 provides pressure filtration for the converter supply. The suction line includes a strainer/filter and a magnetic pick-up is included in a tank 104.

Safety features can include a safety lock cutout switch that will not allow operation until the torque converter is in place and the mechanisms are locked. A proximity switch on the frame could accomplish the same task. Shields or guards (not shown) should be used and put in place prior to testing. An overpressure cutout should be provided to keep pressure from ballooning the torque converter. The pump switch must be on before the motor can be rotated to make sure oil is in the torque converter before rotating. A scatter shield guard can be used around the torque converter and obvious miscellaneous rotating parts are also shielded. The oil reservoir includes a low level shut down/indicator. There is an over temperature shutdown/indicator on oil tank. Differential pressure indicators are provided on the filters.

From the preceding description, it is apparent that the inclusion of the adapter assembly 30 and its associated hydraulic circuit 100 into the dynamometer provides significant versatility and functional advantages. The adapter assembly 30 basically has a front portion adapted to sealingly engage the torque converter 1, thus emulating the input end of a transmission that would be attached to the torque converter 1. The rear portion of the adapter assembly is adapted to mount to a loading device 16. The need for mounting the torque converter 1 to a transmission for test purposes has been successfully eliminated. The torque converter 1 can be tested as an isolated or separate component. Thus, it can be seen that the present invention at least satisfies its stated objectives.

What is claimed is:

1. A dynamometer for testing a torque converter having an impeller, a turbine and a stator, comprising:
    a frame;
    a prime mover mounted on the frame for driving the torque converter;
    a dynamic loading device mounted on the frame and including an eddy current brake for dynamic control of the torque converter;
    an adapter assembly having a rear portion connected to the loading device and having a front portion fluidly and mechanically connected to the torque converter so as to functionally act as an input end of an automotive transmission without actually being an automotive transmission;
    a hydraulic system for routing hydraulic fluid to and from the torque converter through fluid passages formed in the adapter assembly.

2. The dynamometer of claim 1 wherein the adapter assembly includes a housing having a bore therethrough for receiving a hollow stator shaft secured against rotation with respect to the housing and a turbine shaft concentrically supported for rotation within the hollow stator shaft, the stator shaft including a forward end portion engageable with the stator of the torque converter, the turbine shaft including a forward end portion drivingly engaged by the turbine of the torque converter and a rearward end portion drivingly connected to the loading device.

3. The dynamometer of claim 2 wherein the fluid passages in the adapter assembly extend through the housing, the stator shaft and the turbine shaft so as to supply hydraulic fluid to the torque converter.

4. The dynamometer of claim 3 wherein the fluid passages in the adapter assembly include spaced apart first and second passages extending from an exterior surface of the housing into the bore of the housing, a third passage formed in the stator shaft and a fourth passage formed in the turbine shaft, the third passage extending from an exterior surface of the stator shaft into the hollow interior thereof and being in fluid communication with the first passage, the fourth passage having a first portion extending longitudinally out the forward end portion of the turbine shaft and a second portion extending transversely and being fluidly interconnected to the first portion and the third passage.

5. The dynamometer of claim 4 wherein the stator shaft has an exterior surface with an annular groove thereon, the annular groove being in fluid communication with the first passage.

6. The dynamometer of claim 4 wherein the turbine shaft has a reduced diameter portion thereon for fluidly interconnecting the second portion of the fourth passage with the third passage.

7. The dynamometer of claim 1 wherein the hydraulic system is an open circuit hydraulic system including a variable displacement pump and a lockup valve operatively arranged between the pump and the adapter assembly.

8. The dynamometer of claim 7 wherein the lockup valve is a three position four way valve; the valve having a first central position wherein flow through the valve to the adapter assembly and torque converter is blocked, a second position wherein flow is allowed in a first direction through the valve and the torque converter via the adapter assembly, and a third position where flow is reversed and allowed in a second direction opposite the first direction.

9. The dynamometer of claim 8 wherein the three position valve is operated by a pair of opposing solenoids.

10. The dynamometer of claim 1 wherein the prime mover has an output shaft with a central longitudinal axis of rotation, the loading device being spaced from and movable on the frame with respect to the prime mover along the axis of rotation.

11. The dynamometer of claim 1 wherein the loading device is slidably mounted on a rail member attached to the frame and extending parallel to the central longitudinal axis of the prime mover output shaft, the loading device being movable along the rail member by a powered screw mechanism.

12. The dynamometer of claim 1 further comprising data acquisition means.

13. The dynamometer of claim 12 wherein the data acquisition means includes a plurality of sensors connected to the hydraulic circuit.

14. The dynamometer of claim 13 wherein the plurality of sensors includes an input pressure sensor, an output pressure sensor, an input temperature sensor, an output temperature sensor and a flow meter associated with the hydraulic circuit.

15. The dynamometer of claim 13 wherein the plurality of sensors includes an input rpm sensor and an input torque sensor associated with the prime mover output shaft and an output rpm sensor and an output torque sensor associated with the loading device.

16. The dynamometer of claim 13 further comprising a computer connected to the plurality of sensors.

17. The dynamometer of claim 1 wherein the loading device converts rotational mechanical energy into heat.

18. A method of testing a new or rebuilt torque converter comprising the steps of:

mounting the torque converter on a dynamometer having a prime mover, a dynamic loading device and an adapter assembly for attaching the torque converter to the loading device without attaching the torque converter to an automotive transmission, the adapter assembly having an open circuit hydraulic pump associated therewith and a lockup valve operatively arranged between the pump and the adapter assembly;

applying a dynamic force from the loading device to the torque converter to dynamically control the torque converter;

purging the torque converter;

stalling the torque converter;

ramping the torque converter up to full speed;

placing the torque converter in a lockup condition by activating the lockup valve so as to reverse the flow of hydraulic fluid through the torque converter;

checking lockup clutch holding capacity; and shutting down the prime mover and the pump.

19. A dynamometer for testing a torque converter having an impeller, a turbine and a stator, comprising:

a frame;

a prime mover mounted on the frame for driving the torque converter;

a dynamic loading device mounted on the frame and having an eddy brake for dynamically controlling the torque converter and a brake caliper for locking the torque converter;

an adapter assembly having a rear portion connected to the loading device and having a front portion fluidly and mechanically connected to the torque converter so as to functionally act as an input end of an automotive transmission without actually being an automotive transmission;

a hydraulic system for routing hydraulic fluid to and from the torque converter through fluid passages formed in the adapter assembly; and the loading device being movable on the frame with respect to the prime mover.

20. A dynamometer for testing a torque converter having an impeller, a turbine and a stator, comprising:

a frame;

a prime mover mounted on the frame for driving the torque converter;

a dynamic loading device mounted on the frame;

an adapter assembly having a rear portion connected to the loading device and having a front portion fluidly and mechanically connected to the torque converter so as to functionally act as an input end of an automotive transmission without actually being an automotive transmission;

a hydraulic system for routing hydraulic fluid to and from the torque converter through fluid passages formed in the adapter assembly;

a plurality of sensors connected to the hydraulic circuit; and a computer connected to thee plurality of sensors.

* * * * *